United States Patent
Schall et al.

(10) Patent No.: US 12,461,399 B2
(45) Date of Patent: Nov. 4, 2025

(54) METHOD FOR MANUFACTURING AN ELECTRO-OPTICAL DEVICE AND ELECTRO-OPTICAL DEVICE

(71) Applicant: Black Semiconductor GmbH, Aachen (DE)

(72) Inventors: Daniel Schall, Aachen (DE); Galip Reha Hepgüler, Aachen (DE)

(73) Assignee: Black Semiconductor GmbH, Aachen (DE)

( * ) Notice: Subject to any disclaimer, the term of this patent is extended or adjusted under 35 U.S.C. 154(b) by 238 days.

(21) Appl. No.: 17/796,357

(22) PCT Filed: Dec. 17, 2020

(86) PCT No.: PCT/EP2020/086611
§ 371 (c)(1),
(2) Date: Jul. 29, 2022

(87) PCT Pub. No.: WO2021/151584
PCT Pub. Date: Aug. 5, 2021

(65) Prior Publication Data
US 2023/0117534 A1   Apr. 20, 2023

(30) Foreign Application Priority Data
Jan. 31, 2020   (DE) .......................... 102020102533.5

(51) Int. Cl.
*G02F 1/035*   (2006.01)
*G02F 1/025*   (2006.01)
(Continued)

(52) U.S. Cl.
CPC .............. *G02F 1/035* (2013.01); *G02F 1/025* (2013.01); *G02F 1/2257* (2013.01); *H01L 21/31055* (2013.01)

(58) Field of Classification Search
CPC .......... G02F 1/025; G02F 1/035; G02F 1/2257
See application file for complete search history.

(56) References Cited

U.S. PATENT DOCUMENTS 5,372,673 A * 12/1994 Stager ............... H01L 21/31053
                                                           257/E21.244
5,503,882 A    4/1996 Dawson
(Continued)

FOREIGN PATENT DOCUMENTS

CN      101179104 A    5/2008
CN      103439807 A   12/2013
(Continued)

OTHER PUBLICATIONS

Koester et al. High-speed waveguide-coupled graphene-on-graphene optical modulators, Applied Physics Letters, 2012. (Year: 2012).*

(Continued)

*Primary Examiner* — Thomas A Hollweg
*Assistant Examiner* — Kirsten D. Endresen
(74) *Attorney, Agent, or Firm* — CALDERON SAFRAN & WRIGHT P.C.

(57) ABSTRACT

The present application relates to a method for manufacturing an electro-optical device, wherein
a waveguide (3) is provided (S1),
a planarization coat (7) overlapping at least a section of the waveguide (3) is fabricated (S2),
the planarization coat (7) is provided with a spin-on-glass coating (9) (S3),
at least in the region of the spin-on-glass coating (9), a preferably dry chemical etching treatment is carried out (S4),
optionally, the steps of providing the planarization coat (7) with a spin-on-glass coating (9) and the etching treatment are repeated at least once (S5, S6), and (Continued)

an active element (10) is provided (S7) on or above the planarization coat (7) and above the waveguide (3).

18 Claims, 12 Drawing Sheets

(51) Int. Cl.
   G02F 1/225     (2006.01)
   H01L 21/3105   (2006.01)

(56) References Cited

U.S. PATENT DOCUMENTS

| | | | |
|---|---|---|---|
| 5,533,151 A * | 7/1996 | Leonard | G02F 1/065 |
| | | | 359/321 |
| 5,593,741 A | 1/1997 | Ikeda | |
| 6,434,282 B1 | 8/2002 | Binkley et al. | |
| 8,554,022 B1 | 10/2013 | Hochberg et al. | |
| 9,833,219 B2 | 12/2017 | Lu | |
| 9,893,219 B2 | 2/2018 | Suzuki et al. | |
| 10,393,959 B1 | 8/2019 | Razdan et al. | |
| 10,663,766 B2 | 5/2020 | Ma et al. | |
| 2004/0087049 A1 | 5/2004 | Gill et al. | |
| 2009/0190879 A1 | 7/2009 | Hikita et al. | |
| 2009/0190880 A1 | 7/2009 | Hikita et al. | |
| 2009/0231686 A1 | 9/2009 | Atkins et al. | |
| 2010/0290732 A1 | 11/2010 | Gill | |
| 2012/0251029 A1 | 10/2012 | Kobrinsky et al. | |
| 2014/0023321 A1 | 1/2014 | Lu et al. | |
| 2014/0056551 A1 | 2/2014 | Liu et al. | |
| 2014/0264400 A1 | 9/2014 | Lipson et al. | |
| 2015/0043866 A1 | 2/2015 | Chen et al. | |
| 2015/0372159 A1 | 12/2015 | Englund et al. | |
| 2016/0094308 A1 | 3/2016 | Liboiron-Ladouceur et al. | |
| 2016/0327743 A1 | 11/2016 | Kippenberg et al. | |
| 2016/0380121 A1 | 12/2016 | Suzuki et al. | |
| 2017/0062636 A1 | 3/2017 | Ram et al. | |
| 2017/0097468 A1 * | 4/2017 | Czornomaz | G02B 6/13 |
| 2018/0284561 A1 | 10/2018 | Phare et al. | |
| 2019/0317287 A1 | 10/2019 | Raghunathan et al. | |
| 2019/0333905 A1 | 10/2019 | Raghunathan et al. | |
| 2019/0384007 A1 | 12/2019 | Matiss et al. | |
| 2020/0027798 A1 | 1/2020 | Lin et al. | |
| 2020/0209472 A1 | 7/2020 | Roth et al. | |
| 2021/0048587 A1 | 2/2021 | Denoyer et al. | |
| 2021/0098524 A1 | 4/2021 | Liu et al. | |
| 2021/0215897 A1 | 7/2021 | Epitaux et al. | |
| 2022/0066092 A1 | 3/2022 | Gallagher et al. | |
| 2022/0066099 A1 | 3/2022 | Song et al. | |
| 2022/0092016 A1 | 3/2022 | Kumashikar et al. | |
| 2022/0149946 A1 | 5/2022 | Ferrari et al. | |
| 2022/0270930 A1 | 8/2022 | Sreenvasan et al. | |
| 2022/0275174 A1 | 9/2022 | Stowel et al. | |
| 2023/0044697 A1 | 2/2023 | Sharma et al. | |
| 2023/0087124 A1 | 3/2023 | Nie et al. | |

FOREIGN PATENT DOCUMENTS

| | | |
|---|---|---|
| CN | 103969850 A | 8/2014 |
| CN | 105700203 A | 6/2016 |
| CN | 105842782 A | 8/2016 |
| CN | 106199837 A | 12/2016 |
| CN | 106990563 A | 7/2017 |
| CN | 114171671 A | 3/2022 |
| DE | 102020102534 A1 | 1/2020 |
| DE | 202020101285 U1 | 3/2020 |
| DE | 102020102533 A1 | 8/2021 |
| JP | H10335331 A | 12/1998 |
| JP | 2001074963 A | 3/2001 |
| JP | 2009212279 A | 9/2009 |
| JP | 2015069127 A | 4/2015 |
| JP | 2017011209 A | 1/2017 |
| JP | 6230440 B2 | 11/2017 |
| KR | 20150023227 A | 3/2015 |
| KR | 20170118019 A | 10/2017 |
| KR | 102220648 B1 | 2/2021 |
| WO | WO2014089454 A2 | 6/2014 |
| WO | WO2015081538 A1 | 6/2015 |
| WO | WO2016073995 A1 | 5/2016 |
| WO | WO2019138230 A1 | 7/2019 |
| WO | WO2019213139 A1 | 11/2019 |
| WO | WO2022013111 A1 | 1/2022 |

OTHER PUBLICATIONS

Machine translation of JP2001074963 (Year: 2001).*
International Organization for Standardization (ISO), "Geometrical product specifications (GPS)—Surface texture: Areal—Part 6: Classification of methods for measuring surface texture." Feb. 2010.—ISO 25178-6:2010.
Ding, Y. et al. "Efficient electro-optic modulation in low-loss graphene-plasmonic slot waveguides." Nanoscale. 2017; 9(40): pp. 15576-15581.
Zhu, Y. et al. "Hybrid plasmonic graphene modulator with buried silicon waveguide." Optics Communications. Feb. 1, 2020; 456: p. 124559; https://doi.org/10.1016/j.optcom.2019.124559.
Banszerus, K. et al. "Identifying suitable substrates for high-quality graphene-based heterostructures." 2D Materials. Feb. 8, 2017; 4(2): p. 025030.
Wang, C. et al. "Integrated lithium niobate electro-optic modulators operating at CMOS-compatible voltages." Nature. Oct. 2018; 562(7725): pp. 101-104.
Li, X. et al., "Large-area synthesis of high-quality and uniform graphene films on copper foils." Science. Jun. 5, 2009; 324(5932): pp. 1312-1314.
Bae, S. et al., "Roll-to-roll production of 30-inch graphene films for transparent electrodes", Nature Nanotech, vol. 5, Issue: 8, Aug. 2010, pp. 574-578. https://doi.org/10.1038/nnano.2010.132.
Corbett, B. et al. "Transfer print techniques for heterogeneous integration of photonic components." Progress in Quantum Electronics. 52: pp. 1-17; https://doi.org/10.1016/j.pquantelec.2017.01.001.
Translation of International Search Report from corresponding application PCT/EP20/86611 mailed Apr. 19, 2021 (3 pages).
Webster, M. et al. "An efficient MOS-capacitor based silicon modulator and CMOS drivers for optical transmitters." 11th International Conference on Group IV Pho-tonics (GFP), Paris, 2014, pp. 1-2. DOI: 10.1109/Group4.2014.6961998.
Lee, Y. H. D. et al. "Back-End Deposited Silicon Photonics for Monolithic Integration on CMOS," in IEEE Journal of Selected Topics in Quantum Electronics, vol. 19, No. 2, pp. 8200207-8200207, Mar.-Apr. 2013, Art No. 8200207, doi: 10.1109/JSTQE.2012.2209865.
Li, C. et al. "CMOS-compatible high efficiency double-etched apodized waveguide grating coupler." Optics express. Apr. 8, 2013; 21(7): pp. 7868-7874.
Schuler, et al.—"Controlled Generation of a p-n Junction in a Waveguide Integrated Graphene Photodetector" —pubs.acs.org/NanoLett —001: 10.1021/ats.nanolett6b03374—Nano Ltrt. 2016, 16, 7107-7112.
Liu, et al.—"Double-Layer Graphene Optical Modulator" —American Chemical Society Nano Letters—dx.doi.org/10.1021/nl204202k | Nano Lett. 2012, 12, 1482-1485—Feb. 14, 2012.
Schall et al. "Graphene photodetectors with a bandwidth >76 GHz fabricated in a 6 wafer process line", Journal of Physics D: Applied Physics, Institute of Physics Publishing Ltd, GB, vol. 50. No. 12, Feb. 27, 2017 (Feb. 27, 2017). page 124004. [retrieved on Feb. 27, 2017] DOI: 10.1088/1361-6463/AA5C67; ISSN: 0022-3727. XP020314199.
Coudurier, et al.- SciVerse Science Direct—Growth of boron nitride on (0001) AlN templates by High Temperature—Hydride Vapor Phase Epitaxy (HT-HVPE). Physics Procedia 46 ( 2013 ) pp. 102-106.
Hiraki, T. et al. "Heterogeneously integrated III-V/Si MOS capacitor Mach-Zehnder modulator." Nature Photon. Jul. 17, 2017; 11: pp. 482-485. https://doi.org/10.1038/nphoton.2017.120.

(56) References Cited

OTHER PUBLICATIONS

Atabaki, A. H. et al. "Integrating photonics with silicon nanoelectronics for the next generation of systems on a chip." Nature. Apr. 18, 2018; 556; pp. 349-354. https://doi.org/10.1038/s41586-018-0028-z.

Youngblood, N. et al. "Integration of 2D materials on a silicon photonics platform for optoelectronics applications." NANOPHOTONICS, vol. 6. No. 6. Jan. 1, 2017 (Jan. 1, 2017). DOI: 10.1515/nanoph-2016-0155; XP055562146.

Li, Yaguo et al.: Characteristics of diamond turned NiP smoothed with ion beam planarization technique—Published Oct. 13, 2017.

Goykhman, et al.—"On-Chip Integrated, Silicon-Graphene Plasmonic Schottky Photodetector with High Responsivity and Avalanche Photogain"—pubs.acs.org/NanoLett—http://dx.doi.org/10.1021/acs.nanolett.5b05216—Nano Lett. 2016, 16, 3005-3013.

Singh, et al.—"Optomechanical coupling between a multilayer graphene mechanical resonator and a superconducting microwave cavity"—Published Online Aug. 24, 2014; DOI: 10.1038/NNANO.2014.168; pp. 820-824.

Ma, P. et al. "Plasmonically enhanced graphene photodetector featuring 100 Gbit/s data reception, high responsivity, and compact size." ACS Photonics. Nov. 29, 2018; 6(1): pp. 154-161.

Liu, Lin, et al.—"Review of graphene modulators from the low to the high figure of merits"—Journal of Physics D: Applied Physics; Dated Nov. 17, 2020.

Schall, Daniel et al. "50 GBiUs Photodetectors Based on Wafer-Scale Graphene for Integrated Silicon Photonic Communication Systems", ACS Photon/CS, vol. 1, No. 9, Aug. 20, 2014 (Aug. 20, 2014), pp. 781-784 DOI: 10.1021/ph5001605; ISSN: 2330-4022, XP055786770.

Koos, C. et al. "Silicon-organic hybrid (SOH) and plasmonic-organic hybrid (POH) integration." Journal of Lightwave Technology. Jan. 15, 2016; 34(2): pp. 256-268.

Ding, Y. et al. "Ultra-compact integrated graphene plasmonic photodetector with bandwidth above 110 GHz." Nanophotonics. Feb. 1, 2020; 9(2): pp. 317-325. https://doi.org/10.1515/nanoph-2019-0167.

Pu, M. et al. "Ultra-low-loss inverted taper coupler for silicon-on-insulator ridge waveguide." Optics Communications. Oct. 1, 2010; 283(19); pp. 3678-3682 https://doi.org/10.1016/j.optcom.2010.05.034.

Muench J. E. et al. "Waveguide-integrated. plasmonic enhanced graphene photodetectors", Arxiy.Org, Cornell University Library, 201 Olin Library Cornell University Ithaca, Ny 14853, May 12, 2019 (May 12, 2019), DOI: 10.1021/ACS.NANOLETT.9B02238; XP081574008.

Ye, Sheng-Wei et al. "High-Speed Optical Phase Modulator Based on Graphene-Silicon Waveguide", IEEE Journal of Selected Topics in Quantum Electronics, vol. 23, No. 1, Jan. 2017 (Jan. 2017). DOI: 10.1 109/JSTQE.2016.2545238; ISSN: 1077-260X, XP011617315.

\* cited by examiner

METHOD FOR MANUFACTURING AN ELECTRO-OPTICAL DEVICE AND ELECTRO-OPTICAL DEVICE

CROSS-REFERENCE TO RELATED APPLICATIONS AND CLAIM TO PRIORITY

This application is a national stage application of International Application No. PCT/EP2020/086611 filed Dec. 17, 2020, which claims priority to German Patent Application No. 10 2020 102 533.5 filed Jan. 31, 2020, the disclosures of which are incorporated herein by reference and to which priority is claimed.

FIELD OF THE INVENTION

The invention relates to a method for manufacturing an electro-optical device. Furthermore, the invention relates to an electro-optical device, a semiconductor apparatus comprising a chip and at least one electro-optical device, and a semiconductor device comprising a wafer and at least one electro-optical device.

BACKGROUND OF THE INVENTION

Electro-optical devices, for example photodetectors or electro-optical modulators, comprising one or more films of graphene are known. Such devices are disclosed, for example, in U.S. Pat. No. 9,893,219 B2.

In order to allow graphene or other thin materials to be applied to structured surfaces, for example above waveguides, without the film or coat to be applied tearing, in particular at the edges of the structured surface, planarization of the surface is usually required.

Currently, planarization is realized by depositing planarization coats and subsequent chemical mechanical polishing (CMP). Alternatively, spin-on-glass (SOG) or polymers can be spun on.

In spin-on-glass processes, an initially liquid material, for example hydrogen silsesquioxane, is spun on and vitrified during subsequent annealing, which is why it is also referred to as spin-on-glass. Hydrogen silsesquioxane (for short HSQ) is a class of inorganic compounds with the formula $[HSiO_{3/2}]_n$. Due to the kinetics of liquid substances at height differences, a planarization effect results. The hydrogen silsesquioxane coat thickness is smaller or lower on an elevation on the surface than next to the elevation.

One problem with this approach is the comparatively high roughness of the surface, which results essentially from the properties of the spin-on material, and the interaction of the planarization coat with graphene or other materials to be deposited. Since graphene is only one atomic layer thin, any contact with another material leads to changes in the graphene. Not every material is a suitable support material for graphene. Studies have shown that spin-on glasses lead to a change in doping in graphene. The change can be measured by Raman spectroscopy. The applicant is aware that signatures of (unwanted) strain and doping can be detected.

Another problem is that SOG and polymers are generally unstable with respect to chemicals and subsequent process steps.

The CMP process avoids the problem described above because chemically deposited $SiO_2$, for example, can be used as the planarization material. $SiO_2$ has proven to be a very good support material for graphene and excellent low roughness values can be achieved by the CMP process. $SiO_2$ is also stable with respect to common process chemicals and has good dry chemical structuring properties. However, it is sometimes considered a disadvantage that individual raised structures cannot be planarized uniformly over the entire surface, for example of a wafer. The reason for this is that the wafer is pressed onto a grinding plate during polishing, and only the raised parts of the wafer surface are polished. If the distance between adjacent elevations on the wafer surface is too large (for example in the order of 100 to 1000 μm), and the distribution on the wafer is not homogeneous, a laterally uneven coat thickness may result after polishing. The low tolerances of the coat thickness to be set after planarization (usually single-digit nm) require support points on the entire wafer at the same height as the structured surface for reproducibility. The shape and arrangement of the support points has a considerable influence on the result of the etching processes used for surface structuring and the CMP. This results in an increased effort in design and process development, because the support points have to be designed and developed in addition to the actual component design.

In addition, the desired residual coverage on the waveguide, for example in the order of 10 nm, can lead into the limit ranges of the tolerance of CMP steps. To achieve reproducible results, to the best of the applicant's knowledge, the entire $SiO_2$ planarization coat is polished down to the surface of the waveguides and support points (the Si is polished more slowly, which results in "stopping" at the correct height). Since an oxide is required on the waveguide, the wafer is then dry oxidized (i.e., under high temperature and addition of $O_2$, Si oxidizes). At the free Si surfaces, the Si is oxidized into $SiO_2$.

SUMMARY OF THE INVENTION

Based on this, it is a task of the present invention to provide a method for manufacturing an electro-optical device which can be carried out with reasonable effort and avoids the aforementioned disadvantages.

This task is solved by a method for manufacturing an electro-optical device, in particular a photodetector or electro-optical modulator, wherein
 a waveguide is provided,
 a planarization coat overlapping at least one section of the waveguide is fabricated, preferably by applying, in particular depositing, a coating material,
 the planarization coat is provided with a spin-on-glass coating,
 at least in the region of the spin-on-glass coating, a preferably dry chemical etching treatment is carried out, in the course of which etching is preferably carried out down to the planarization coat and preferably the spin-on-glass coating and a part of the planarization coat are removed,
 optionally, the steps of providing the planarization coat with a spin-on-glass coating and the etching treatment are repeated at least once, and
 an active element is provided on or above the planarization coat and above the waveguide, which active element comprises or consists of at least one material, which absorbs electromagnetic radiation of at least one wavelength and generates an electric photosignal as a result of the absorption and/or whose refractive index changes as a function of a voltage and/or the presence of charge(s) and/or an electric field.

The present invention circumvents the disadvantages associated with spin-on planarization, in particular the high roughness and instability, and those of the CMP technique, by specifically using the resist planarization process known from other fields of application to obtain a flat surface profile above a waveguide suitable for the deposition of an active element, for example graphene film, with simultaneously low residual thickness above the waveguide and sufficiently low roughness. This makes it possible to prevent damage, in particular tearing off an active element, in a particularly reliable manner. As a result, electro-optical devices can be obtained which are characterized by excellent properties, in particular also a particularly reliable mode of operation. Since tearing off the active element is reliably prevented, the manufacturing process is associated with low scrap.

The procedure according to the invention allows comparatively low roughnesses to be obtained, in particular on the upper surface of the planarization coat, approximately in the range of 1.0 nm RMS to 0.1 nm RMS, in particular 0.6 nm RMS to 0.1 nm RMS, preferably 0.4 nm RMS to 0.1 nm RMS. A roughness of 0.2 nm RMS, for example, has proved particularly suitable. Here and in the following, the abbreviation nm stands for nanometer ($10^{-9}$ m) in a manner known per se. The abbreviation RMS stands for root mean squared. The RMS roughness is also referred to in German as "quadratische Rauheit".

Roughnesses in these areas have proven to be particularly suitable. They are particularly advantageous for avoiding stress and strain in overlying coats. In this context, we also refer to the paper "Identifying suitable substrates for high-quality graphene-based heterostructures" by L. Banszerus et al, 2D Mater., Vol. 4, No. 2, 025030, 2017.

Atomic force microscopy (AFM) can be used as a measuring method for determining roughness, in particular as described in EN ISO 25178. Atomic force microscopy is discussed primarily in Part 6 (EN ISO 25178-6:2010-01) of this standard, which deals with measurement methods for roughness determination.

For example, the electro-optical device may be fabricated on a wafer or chip or on an element or coat provided on a wafer or chip. Then, preferably, the provided waveguide is arranged on or above a wafer or chip, the wafer or chip particularly preferably having integrated circuits with integrated electronic components.

It is, of course, possible that multiple waveguides are provided and multiple electro-optical devices are obtained in the manner of the invention. For example, it may be that a wafer or chip is provided having two or more waveguides provided on the upper side thereof. This may be an integrated waveguide of a wafer or chip. A planarization coat and a spin-on-glass coating can then be fabricated that extend over all waveguides, in particular over the entire wafer or chip upper side, and etching can be performed over the entire top surface. If the steps of providing the planarization coat with a spin-on-glass coating and the etching treatment are repeated, this can also apply to the repetition(s). Thus, a plurality of electro-optical devices can be obtained in a particularly simple manner in accordance with the invention.

A waveguide is an element or component that guides an electromagnetic wave, in particular light. In order to guide the wave, a wavelength-dependent cross-section of a material that is optically transparent for at least this wavelength and is distinguished from an adjacent material that is also transparent for this wavelength by a refractive index contrast is used. If the refractive index of the surrounding material is lower, the light is guided in the region of higher refractive index. For the particular case of a slit mode, two regions of high refractive index are separated from a region of low refractive index that is narrow with respect to the wavelength, and the light is guided in the region of low refractive index. To achieve low losses due to scattering, a low sidewall roughness is advantageous.

Waveguide and planarization coat are expediently made of materials with different refractive indices. Purely exemplary pairs of refractive indices are 3.4 (Si) for the waveguide(s) and 1.5 (SiO2) for the planarization coat or, in the case of dielectrics, 2.4 (TiO2) for the waveguide(s) and 1.5 (SiO2) for the planarization coat or 2 (SiN) for the waveguide(s) and 1.47 for the planarization coat.

It is particularly preferred that the refractive index of the material of the waveguide(s) is at least 20%, preferably at least 30%, greater than the refractive index of the material of the planarization coat.

In a further preferred embodiment, the waveguide or—in the case of several waveguides—at least one of the waveguides of the photonic platform comprises at least one material which is transparent to electromagnetic radiation of a wavelength of 850 nm and/or 1310 nm and/or 1550 nm or consists of such a material. Particularly preferably, it is transparent to electromagnetic radiation in the wavelength range from 800 nm to 900 nm and/or from 1260 nm to 1360 nm (so-called original band or O-band for short) and/or 1360 nm to 1460 nm (so-called extend band or E-band for short) and/or 1460 nm to 1530 nm (so-called short band or S-band for short) and/or from 1530 nm to 1565 nm (so-called conventional band or C-band for short) and/or 1565 nm to 1625 nm (so-called long band or L-band for short). These bands are known from the field of communications engineering.

The waveguide or—in the case of several—at least one of the waveguides may, in a further advantageous embodiment, comprise titanium dioxide and/or aluminium nitride and/or tantalum pentoxide and/or silicon nitride and/or aluminium oxide and/or silicon oxynitride and/or lithium niobate and/or silicon, in particular polysilicon, and/or indium phosphite and/or gallium arsenide and/or indium gallium arsenide and/or aluminium gallium arsenide and/or at least one dichalcogenide, in particular two-dimensional transition metal dichalcogenide, and/or chalcogenide glass and/or resins or resin-containing materials, in particular SU8, and/or polymers or polymer-containing materials, in particular OrmoComp, or consist of one or more of these materials. The (respective) waveguide may be or have been obtained by material deposition and in particular subsequent structuring.

With respect to the dimensions of the waveguide(s), the following may apply in particular. The thickness is preferably in the range of 150 nanometers to 10 micrometers. The width and length of the waveguide(s) may in particular be in the range of 100 nanometers and 10 micrometers.

One or more waveguides can, for example, be embodied as strip waveguides, which are then characterized in particular by a rectangular or square cross-section. One or more waveguides can alternatively or additionally also be embodied as ridge waveguides with a T-shaped cross section. Further alternatively or additionally it is possible that at least one waveguide is given by a slot waveguide.

The waveguide(s) may be multi-part, such as comprising or consisting of a first, for example lower or left, and a second, for example upper or right, part or section. It may be that one or more sections are characterized by a rectangular or square cross-section. If a waveguide has or consists of two or more parts, they may be spaced apart, for example forming a slot.

Preferably, the planarization coat is fabricated by applying, preferably depositing, coating material at least on or above a section, in particular a longitudinal section, of the respective waveguide(s) and on regions laterally of the respective waveguide(s), in particular next to the respective waveguide(s). Of course, material can also be deposited on the entire (respective) waveguide. That coating material is also applied laterally of a waveguide means in particular or includes in particular that material is applied next to the waveguide on the substrate on which the waveguide is arranged.

The planarization coat can further be fabricated by chemical vapor deposition (CVD), preferably low pressure chemical vapor deposition (LPCVD) and/or plasma enhanced chemical vapor deposition (PECVD), and/or physical vapor deposition of a coating material.

There are various prior art chemical vapor deposition processes, all of which can be used in the context of the present invention. Common to all of them is usually a chemical reaction of introduced gases, which leads to a deposition of the desired material.

Also with regard to physical vapor deposition, all variants known from the prior art can be used. Purely by way of example, electron beam evaporation, in which material is melted and evaporated by means of an electron beam, and thermal evaporation, in which material is heated to the melting point by means of a heater and evaporated onto a target substrate, as well as sputter deposition, in which atoms are knocked out of a material carrier by means of a plasma and deposited onto a target substrate, can be mentioned.

As an alternative or in addition to the above-mentioned deposition processes, atomic layer deposition can also be considered. In this process, insulating or conductive materials (dielectrics, semiconductors or metals) are sequentially deposited atomic layer by atomic layer.

Sputtering is another option that can be used in the production of the planarization coat.

It should be noted that a fabricated coat may comprise only one or several layers. It may comprise only one material or it may comprise multiple materials. For example, a coat may have two or more layers of two or more different materials. Of course, a coat may also have multiple layers, but they may all be made of the same material. In particular, a coat with more than one layer can be obtained or be present because several layers, for example several atomic layers, are or were provided, for example deposited, for the fabrication thereof.

A further embodiment is characterized in that a planarization coat comprising or consisting of at least one oxide, in particular silicon dioxide, and/or comprising or consisting of at least one nitride and/or with or from at least one polymer is fabricated.

Furthermore, it can be provided that the planarization coat is provided with a spin-on-glass coating by applying a suitable material, for example HSQ and/or a polymer, in the liquid state, preferably spun on and subsequently heated, in particular baked out. During heating, in particular bake-out, the materials vitrify.

Preferably, a dry chemical etching process takes place. Reactive ion etching (for short RIE) has proven to be particularly suitable.

The etching can be carried out, for example, with CHF3- and/or SF6-based dry chemical etching processes. The abbreviation CHF3 stands for fluoroform and the abbreviation SF6 for sulfur hexafluoride.

The etching treatment is preferably carried out in such a way that the etching rate for the material of the planarization coat is greater or smaller by a maximum of 50%, preferably a maximum of 30%, particularly preferably a maximum of 10% than the etching rate for the spin-on glass. The etching process can be adjusted in a previously known manner via process parameters. Suitable parameters include, for example, the pressure and/or the gas flow and/or the composition of the gas mixture and/or the power for exciting the plasma and/or the temperature of the electrode.

Reactive ion etching, for example, is a dry etching process in which selective and directional etching of a substrate surface is usually made possible by means of special gaseous chemicals that are excited to form a plasma. A resist mask can be used to protect parts that are not to be etched. The etch chemistry and parameters of the process usually determine the selectivity of the process, i.e., the etch rates of different materials. This property is crucial for limiting the depth of an etching process and thus defining coats separately from each other.

On or above the surface of the planarization coat obtained as a result of the resist planarization, i.e. in the region previously subjected to the etching treatment, an active element comprising or consisting of at least one material, which absorbs electromagnetic radiation of at least one wavelength and generates an electrical photosignal as a result of the absorption and/or whose refractive index changes as a function of a voltage and/or the presence of charge(s) and/or an electric field, is provided in accordance with the invention in the region of the or the respective waveguide.

In a preferred embodiment, the at least one material can absorb electromagnetic radiation of a wavelength of 850 nm and/or 1310 nm and/or 1550 nm and generate a photosignal as a result of the absorption. It is particularly preferred that it can absorb electromagnetic radiation in the wavelength range from 800 nm to 900 nm and/or from 1260 nm to 1360 nm (so-called original band or O-band for short) and/or 1360 nm to 1460 nm (so-called extend band or E-band for short) and/or 1460 nm to 1530 nm (so-called short band or S-band for short) and/or 1530 nm to 1565 nm (so-called conventional band or C-band for short) and/or 1565 nm to 1625 nm (so-called long band or L-band for short) and can generate a photosignal as a result of the absorption.

That a material changes its refractive index is to be understood in particular in that it changes its dispersion (in particular refractivity) and/or its absorption. The dispersion or refractivity is usually given by the real part and the absorption by the imaginary part of the complex refractive index. Materials whose refractive index changes as a function of a voltage and/or the presence of charge(s) and/or an electric field are understood herein to be, in particular, those characterized by the Pockels effect and/or the Franz-Keldysh effect and/or the Kerr effect. Furthermore, materials which are characterized by the plasma dispersion effect are also considered as such materials.

Furthermore, it may be provided that as the at least one material of the active element, which absorbs electromagnetic radiation of at least one wavelength and generates an electrical photosignal as a result of the absorption, and/or whose refractive index changes as a function of a voltage and/or the presence of charge(s) and/or an electric field, graphene and/or at least one dichalcogenide, in particular two-dimensional transition metal dichalcogenide, and/or heterostructures of two-dimensional materials and/or germanium and/or lithium niobate and/or at least one electro-optical polymer and/or silicon and/or at least one compound semiconductor, in particular at least one III-V semiconductor and/or at least one II-VI semiconductor, are used.

Electro-optical polymers in particular are to be understood as polymers which are characterized by having a strong linear electro-optical coefficient (Pockels effect). A strong linear electro-optical coefficient is preferably to be understood as such amounting to at least 150 pm/V, preferably at least 250 pm/V. The electro-optical coefficient is at least about five times that of lithium niobate then.

There are different chalcogenides. In the context of the present invention, transition metal dichalcogenides as two-dimensional materials, such as MoS2 or WSe2, have proved particularly suitable.

It should be noted that lithium niobate and electro-optical polymers are based on the electro-optical, in particular the Pockels effect, i.e. the E-field changes the refractive index (as e.g. the Pockels effect is used in the Pockels cell). In germanium, it is the Franz-Keldysh effect, i.e., the field shifts the valence and conduction band edges with respect to each other, changing the optical properties. These effects are field-based effects. For silicon or graphene, it is the charge carrier-based plasma dispersion effect, i.e., charge carriers (electrons or holes) are brought into the optical mode region (either there is a capacitor in the device that is charged or a diode with a junction that is depleted and enriched). The refractivity (real part of the index) and the absorption (imaginary part of the index, leading to free carrier absorption) change with the charge carrier concentration.

III-V semiconductors are compound semiconductors consisting of elements of main groups III and V in a manner known per se. II-VI semiconductors are compound semiconductors consisting of elements of main group II or group 12 elements and elements of main group VI.

Many materials are characterized both by the fact that their refractive index changes as a function of a voltage and/or the presence of charge and/or an electric field, and by the fact that they absorb electromagnetic radiation of at least one wavelength and generate an electric photosignal as a result of the absorption. For graphene, for example, this is the case. Graphene is accordingly suitable for both the active elements of photodetectors and modulators. This also applies to dichalcogenides, such as two-dimensional transition metal dichalcogenides, heterostructures of two-dimensional materials, germanium, silicon, as well as compound semiconductors, in particular III-V semiconductors and/or II-VI semiconductors. Lithium niobate, for example, is generally only suitable for modulators. Since it is transparent, it does not fulfil the absorbing property and is therefore not suitable for photodetectors.

Films of graphene, possibly chemically modified graphene, or also dichalcogenides, in particular two-dimensional transition metal dichalcogenides, or also dichalcogenide-graphene heterostructures consisting of at least one layer of graphene and at least one layer of a dichalcogenide or arrangements of at least one layer of boron nitride and at least one layer of graphene, have proved to be particularly suitable.

In waveguides, part of the electromagnetic radiation, in particular light, is evanescently guided outside the waveguide. The interface of the waveguide is dielectric and accordingly the intensity distribution is described by the boundary conditions according to Maxwell with an exponential decay. If an electro-optically active material, for example graphene, is brought onto or near the waveguide in the evanescent field, photons can interact with the material, in particular graphene.

There are four effects in graphene that lead to photocurrent. One is the bolometric effect, according to which the absorbed energy increases the resistance of the graphene and reduces an applied DC current. The change of the DC current is then the photo signal. Another effect is the photoconductivity. Here, absorbed photons cause the charge carrier concentration to increase and the additional charge carriers reduce the resistance of the graphene because of the proportionality of the resistance to the charge carrier concentration. An applied DC current increases and the change is the photosignal. There is also a thermoelectric effect, according to which a thermoelectric voltage results from a pn-junction and a temperature gradient at this junction due to different Seebeck coefficients for the p and n region. The temperature gradient results from the energy of the absorbed optical signal. This thermoelectric voltage is then the signal. The fourth effect is due to the fact that at a pn-junction the excited electron-hole pairs are separated. The resulting photocurrent is the signal.

A further embodiment of the method according to the invention is characterized in that, in order to obtain an electro-optic modulator as the electro-optic device, the following steps are further performed:

a dielectric coat is fabricated on the active element, preferably a dielectric coat comprising or consisting of at least one oxide and/or nitride, particularly preferably comprising or consisting of aluminium oxide and/or silicon nitride and/or hafnium oxide, and on the upper side of the dielectric coat facing away from the active element a further active element is provided, the further active element preferably being arranged offset with respect to the active element in such a way that the active element and the further active element lie one above the other in sections.

It should be noted that, alternatively to the further active element comprising or consisting of a material which absorbs and outputs a photosignal and/or changes its refractive index, an electrode made of electrically conductive material can also be provided. In other words, in a modulator, one active element and one conventional electrode suffice as an alternative to two active elements. If an electrode is provided instead of one of the active elements, this electrode can be in the form of a film, possibly with multiple layers, such as a single-layer or multilayer metal film, by analogy with the active element.

The two active elements or the one active element and the electrode are preferably spaced apart and offset from each other in such a way that they lie above one another in sections. In other words, a section of one active element then aligns or overlaps with a section of the other active element or the electrode without them touching. Preferably, at least in the region of lying above one another, in other words in the overlapping region, the two active elements or the active element and the electrode or at least sections thereof extend at least substantially parallel to one another.

Also in the case of a modulator with two active elements or one active element and a conventional electrode, it may further apply that the respective active element or the one active element and the electrode are fabricated in the form of a film.

If a modulator has a further active element, this can also be characterized by the features described above and below as preferred in connection with an active element. The design as a film is only one example. Furthermore, only one or several of the preferred features may be realized.

An electro-optical modulator can be used in particular for optical signal coding. An electro-optical modulator can also be embodied as a ring modulator. A photodetector can preferably serve the signal conversion back from the optical to the electronic world and/or vice versa.

In the case of a modulator, as explained above, an electrical control electrode and an active element, suitably insulated for this purpose, can be provided comprising or consisting of at least one material whose refractive index changes as a function of a voltage or charges or an electric field, in particular graphene, or the electrode can also be made of a corresponding material, in particular graphene, so that in operation two active elements are then together in the evanescent field and perform the electro-optical function. Graphene, for example, can change its optical properties by a control voltage. In the particularly advantageous case of a graphene-dielectric-graphene arrangement, a capacitance is created and the two films of graphene influence each other. A voltage charges the capacitance consisting of the graphene electrodes forming two active elements and the electrons occupy states in the graphene. This results in a shift of the Fermi energy (energy of the last occupied state in the crystal) to higher energies (or to lower ones due to symmetry). When the Fermi energy reaches half the energy of the photons, they can no longer be absorbed because the free states required for the absorption process are already occupied at the correct energy. In this state, the graphene is consequently transparent because absorption is forbidden. By changing the voltage, the graphene is switched back and forth between absorbing and transparent. A continuously shining laser beam is modulated in its intensity and can thus be used for information transmission. Likewise, the real part of the refractive index changes with the control voltage. By changing the voltage, the phase position of a laser can be modulated via the changing refractive index and thus phase modulation can be achieved. Preferably, the phase modulation is operated in a range where all states are occupied up to above half the photon energy, so that the graphene is transparent and the real part of the refractive index shifts significantly and the change of the absorption plays a minor role.

In a further preferred embodiment, the respective active element(s) is/are provided on or above the upper surface of the planarization coat by applying, in particular depositing, at least one suitable material. A deposition can be carried out—in analogy to the planarization coat—for example by chemical vapor deposition (CVD), preferably low pressure chemical vapor deposition (LPCVD), and/or plasma enhanced chemical vapor deposition (PECVD) and/or by physical vapor deposition. Again, all previously known processes of this type can be applied.

It is also possible that the active element or the respective active element is provided on the upper surface of the planarization coat by means of a transfer process. This means in particular that the (respective) element is not monolithically fabricated on the planarization coat, but is separately fabricated and then transferred. A transfer process for graphene is described, for example, from the papers "Large-Area Synthesis of High-Quality and Uniform Graphene Films on Copper Foils" by Li et al., Science 324, 1312, (2009) and "Roll-to-roll production of 30-inch graphene films for transparent electrodes" by Bae et al, Nature Nanotech 5, 574-578 (2010) or for LiNbO from the paper "Integrated lithium niobate electro-optic modulators operating at CMOS-compatible voltages," Nature volume 562, pages 101104 (2018), respectively. Known for GaAs from the paper "Transfer print techniques for heterogeneous integration of photonic components," Progress in Quantum Electronics Volume 52, March 2017, pages 1-17. One of these techniques can also be used in the context of the present invention to obtain one or more graphene or LiNbO or GaAs coats/films on the planarization coat.

Atomic layer deposition may also be considered for the active element(s) as an alternative or in addition to the above processes.

A dielectric coat may further be provided on or above at least one active element.

The or at least one electro-optical device—both in the case of a modulator and in the case of a detector—may further be embodied or manufactured as such with plasmonic coupling.

Then, expediently, at least one plasmonic structure consisting of or comprising a plasmonically active material, preferably gold and/or silver and/or aluminium and/or copper, is provided on or above the or at least one of the active elements. The plasmonic structure preferably comprises at least one pair of plasmonic elements arranged next to one another and consisting of or comprising the plasmonically active material. The plasmonic elements may be characterized by a section tapering toward the other plasmonic element. For example, the plasmonic elements may be characterized by a triangular shape.

Elongated plasmonic elements may also be provided, preferably in the case of a modulator. Elongated plasmonic elements may be arranged at least substantially parallel to a waveguide. Then, in other words, optical and plasmonic waveguides are guided past the active element in parallel, as described in "Efficient electro-optic modulation in low-loss graphene-plasmonic slot waveguides," by Zhu et al, Optics Communications (2019), doi: https://doi.org/10.1016/j.optcom.2019.124559.

The or at least one of the active elements is further expediently arranged relative to a waveguide such that it is at least partially exposed to the evanescent field of electromagnetic radiation guided by the waveguide. Preferably, at least one active element is arranged at a distance less than or equal to 50 nm, more preferably less than or equal to 30 nm, from at least one waveguide, for example at a distance of 10 nm.

Preferably, the resist planarization with the (single or multiple) spin-on-glass coating and subsequent etching treatment is carried out in such a way that the coat thickness of the planarization coat above the waveguide or at least a section thereof is less than or equal to 50 nm, preferably less than or equal to 30 nm, for example 10 nm. If an active element is then arranged in the area of this coat thickness on the planarization coat, a corresponding spacing is present.

It should be noted that in particular that section, preferably longitudinal section, of the waveguide above which the active element—and possibly the further active element present, in particular in the case of a modulator—is arranged can or does form a component of the electro-optical device.

In particular, a film is preferably provided as an active element or films are provided as active elements. A film is preferably characterized in a manner known per se by a significantly greater lateral extent than thickness. The at least one active element of one or more electro-optical devices may further be characterized by a square or rectangular cross-section.

One or more active elements may comprise several layers or coats of at least one material whose refractive index changes and/or which absorbs, or may be formed from one or more layers of at least one such material. In particular, it may be provided that at least one active element comprises, as a film, a plurality of layers or coats of one or even different materials.

For obtaining active elements for a plurality of electro-optical devices, at least one film (with one or also several layers) extending, if necessary, over the entire lateral extent of, for example, a wafer on which a plurality of waveguides are present, can be provided, for example deposited, and from this large film a plurality of smaller film- or coat-shaped active elements lying next to one another in a plane can be obtained for the plurality of devices by means of a suitable structuring process, which can include, for example, lithography and/or etching. Thus, with comparatively little effort, many active elements can be obtained for a plurality of electro-optical devices.

Structuring can also follow a transfer procedure.

The—in case of several the respective—active element is preferably provided directly on the planarization coat, for example fabricated or arranged on it, this expediently in the (respective) region subjected to the etching treatment and above the (respective) section, in particular longitudinal section of the waveguide. However, it is also not excluded that at least one further coat is initially provided, for example deposited or arranged, on the planarization coat and the active element is provided on the or the uppermost further layer. Then it is not directly on but above the planarization coat. This is possible in particular because material can be deposited conformally onto the planarization coat, for example, with the surface properties including topology and roughness remaining intact, practically deposited into the upper side of any further coat or coats that may be present.

In a further advantageous embodiment, contact elements associated with the (respective) active element are fabricated. The or the respective element can, for example, be connected to a contact element on one side or also on opposite sides.

If the waveguide is also located on a chip or wafer with integrated electronic components, one or more contact elements can connect the (respective) active element with interconnection elements, in particular VIAs, via which in turn a connection with one or more integrated electronic components is achieved. Interconnection elements extending through the planarization coat can be fabricated within the scope of the method according to the invention.

It should be noted that in particular in the case of a detector with only one active element, it can be provided that the active element—in particular for connection with one or more electronic components—is in contact with two contacts or contact elements, preferably on opposite sides, and in the case of a modulator with two active elements or one active element and one electrode, it applies that the two active elements or the active element and electrode—in particular for connection with one or more integrated electronic components—are each in contact with one contact or contact element. This is preferably the case at those end regions or ends that face away from the region, in which they lie one above another or overlap in sections.

It can also be that at least one, preferably two gate electrodes are provided. In particular, in the case of an electro-optical device embodied as a photodetector, two gate electrodes can preferably be assigned to the or an active element. These are preferably embodied and arranged in such a way that the charge carrier concentration in the active element, for example graphene film, can be adjusted via them and thus, for example, a pn-junction can be obtained. The gate electrodes are preferably arranged at a suitable distance from the active element and electrically insulated therefrom, for example via a dielectric coat. It is possible that a dielectric coat is provided on the active element and the gate electrodes are arranged on the dielectric coat, for example fabricated on the dielectric coat or transferred to it.

The invention also relates to an electro-optical device obtained by carrying out the method according to the invention.

Another object of the invention is a semiconductor apparatus comprising a chip and at least one, preferably more, electro-optical devices according to the invention.

Finally, the invention relates to a semiconductor device comprising a wafer and at least one, preferably more, electro-optical devices according to the invention.

The electro-optical device or devices are preferably provided on the chip or wafer, in particular on the back-end-of-line.

A wafer is preferably understood to be a component or element or device from which a plurality of chips is obtained by wafer dicing, which is also referred to in German as "Wafer zerkleinern". A wafer expediently has one or more markings along which the dicing can or must take place. The dicing or fragmenting may include, for example, (laser) cutting or sawing or scribing or breaking of the wafer. In English, a single or isolated chip is also referred to as a die, or chips in the plural are also referred to as dies or dice. It should be noted that some chips after dicing are also referred to as bare chips or bare dies. "Bare" refers to the fact that the chips have not yet been placed in a package. "Bare" chips without a package are also referred to as chips for short.

If a wafer—or chip—is viewed in cross-section, its vertical structure can be divided into different sub-regions. The lowest part is the front-end-of-line or FEOL for short, which comprises one or more integrated electronic components. The integrated electronic component(s) may be, for example, transistors and/or capacitors and/or resistors. Above the front-end-of-line is the back-end-of-line, or BEOL for short, which usually contains various metal layers by means of which the integrated electronic components of the FEOL are interconnected.

A wafer comprises a plurality of regions which, following dicing/fragmenting/unification, each form a chip or die. These regions are also referred to herein as chip or die regions. Each chip region of the wafer preferably comprises a section or partial region of the, in particular, single-piece semiconductor substrate of the wafer. Preferably, each chip region further comprises one or more integrated electronic components which extend in and/or on the corresponding region of the semiconductor substrate—in particular in the FEOL when viewed in cross-section.

If a wafer or chip is provided with several waveguides arranged in particular on the back-end-of-line, several electro-optical devices are preferably manufactured in the manner according to the invention, each of which is expediently associated with a waveguide and may comprise a section, in particular a longitudinal section thereof.

It may be that the integrated electronic component(s) of several, in particular all, chip regions of the wafer are identical. Then a plurality of identical chips can be obtained by dicing.

With respect to embodiments of the invention, reference is also made to the subclaims and to the following description of several embodiments with reference to the accompanying drawing.

All figures show purely schematic representations. In the figures, the same components or elements are marked with the same reference signs.

DETAILED DESCRIPTION OF THE PREFERRED EMBODIMENT(S)

Figure 1:
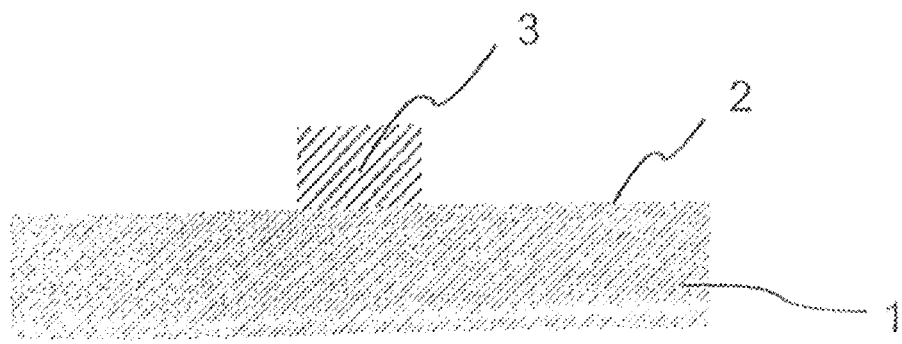
FIG. 1 a waveguide arranged on a wafer in purely schematic sectional representation.
Figure 12:
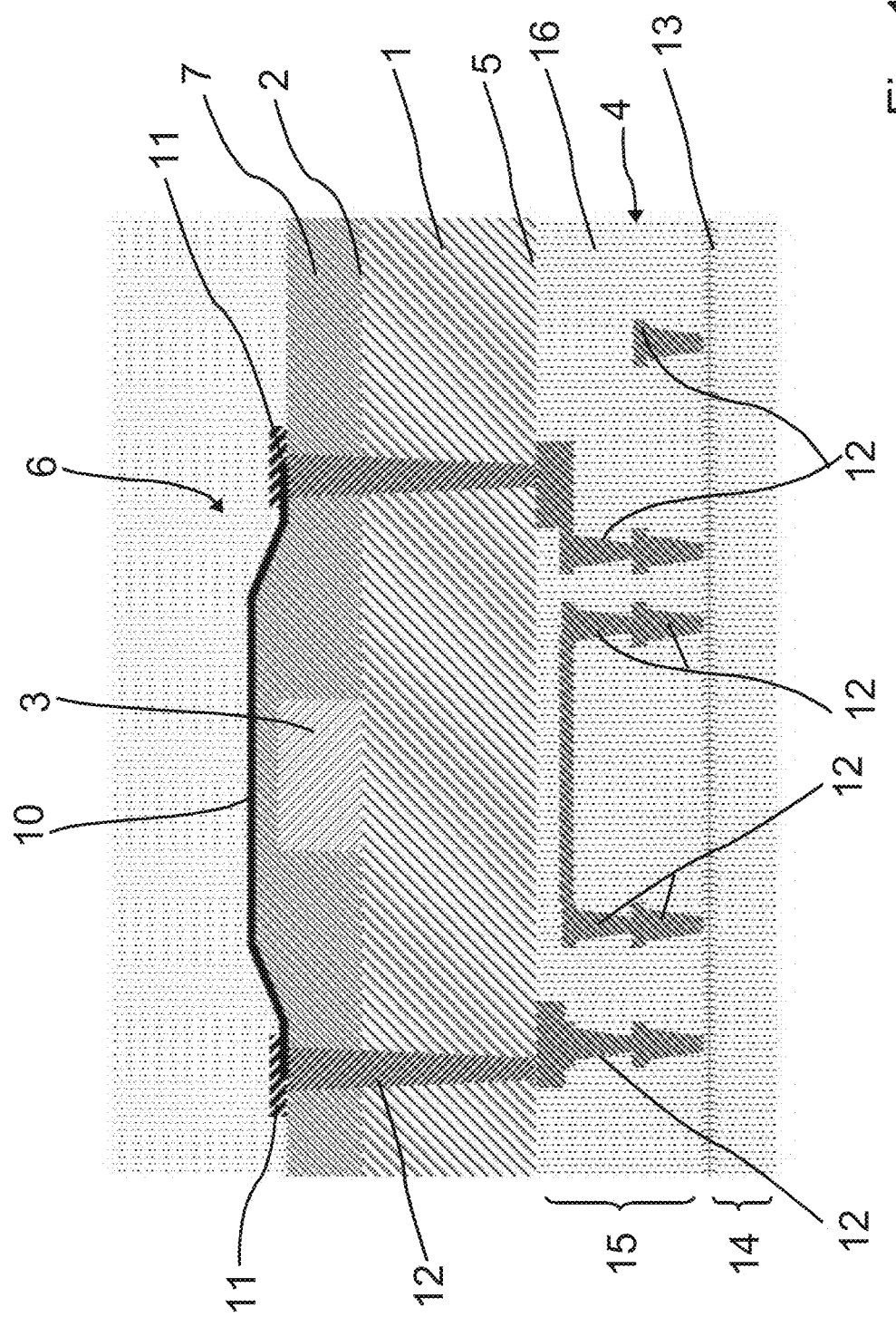
FIG. 12 the arrangement of FIG. 11 with contact and interconnection elements.

FIG. 1 shows a partial sectional view through a coat of $SiO_2$ 1, on the upper side 2 of which, pointing upwards in the figure, a waveguide 3 is arranged. The $SiO_2$ layer is located on a wafer 4 which is not visible in FIG. 1 but is shown in FIG. 12.

In the embodiment shown, a plurality of waveguides 3 are arranged on the upper side 2 of the coat 1 for which one waveguide 3 is shown as an example in FIG. 1. In particular, dielectrics, preferably titanium dioxide, which was also used in the illustrated embodiment, are suitable as waveguide materials, although this is to be understood as exemplary. As far as the dimensions of the waveguide(s) 3 are concerned, it is preferred that their thickness is in the range from 150 nanometers to 10 micrometers and their width and length are in the range from 100 nanometers to 10 micrometers. The exemplary waveguide 3 shown in FIG. 1 is 300 nm thick, has a width of 400 nm and is characterized by a length—oriented perpendicular to the drawing plane—of 5 micrometers.

The coat 1 consisting of $SiO_2$ is also to be understood purely exemplary. A coat of another material could also be provided on the wafer 4, for example. The waveguides 3 could also be arranged directly on the upper side 5 of the wafer 4, which faces upwards in FIG. 12.

Electro-optical devices 6, specifically photodetectors or modulators, are to be fabricated for several of the waveguides 3, which is possible by carrying out the embodiment of the method according to the invention described below.

The fabrication of the electro-optical devices 6 is described in part by way of example using the one waveguide 3 shown in FIG. 1.

Figure 2:
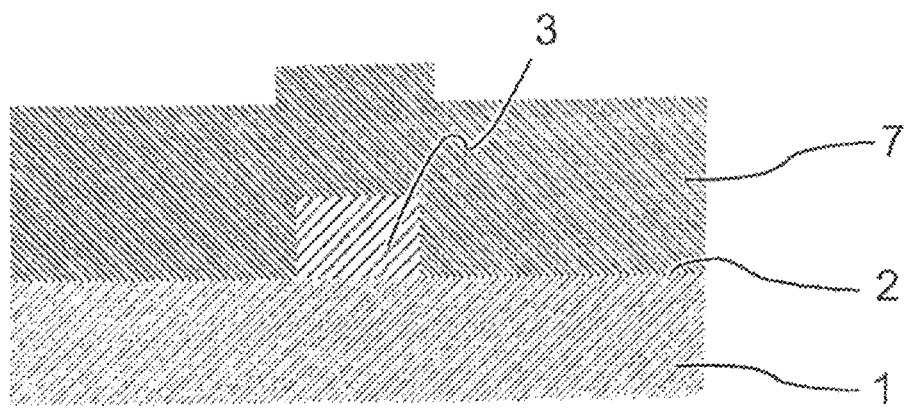
FIG. 2 the waveguide from FIG. 1 with the planarization coat fabricated thereon.

After providing the wafer 4 with the waveguides 3 (step S1), a planarization coat 7 is fabricated in a second step S2, which planarization coat 7 extends at least over a section of the respective waveguide 3 and on two opposite sides beyond the respective waveguide 3. In the example described here, a planarization coat 7 extending over the entire upper surface 2 of the coat 1 provided on the wafer 4 is fabricated. This extends correspondingly over and between all waveguides 3 arranged on the upper side 2, so that this requirement is fulfilled. As can be seen in FIG. 2, which shows the arrangement obtained following the fabrication of the planarization coat 7—in the same partial section as in FIG. 1—exemplarily for the one waveguide 3, there is material of the planarization coat 7 both on and to both lateral sides of the waveguide 3.

Figure 7:
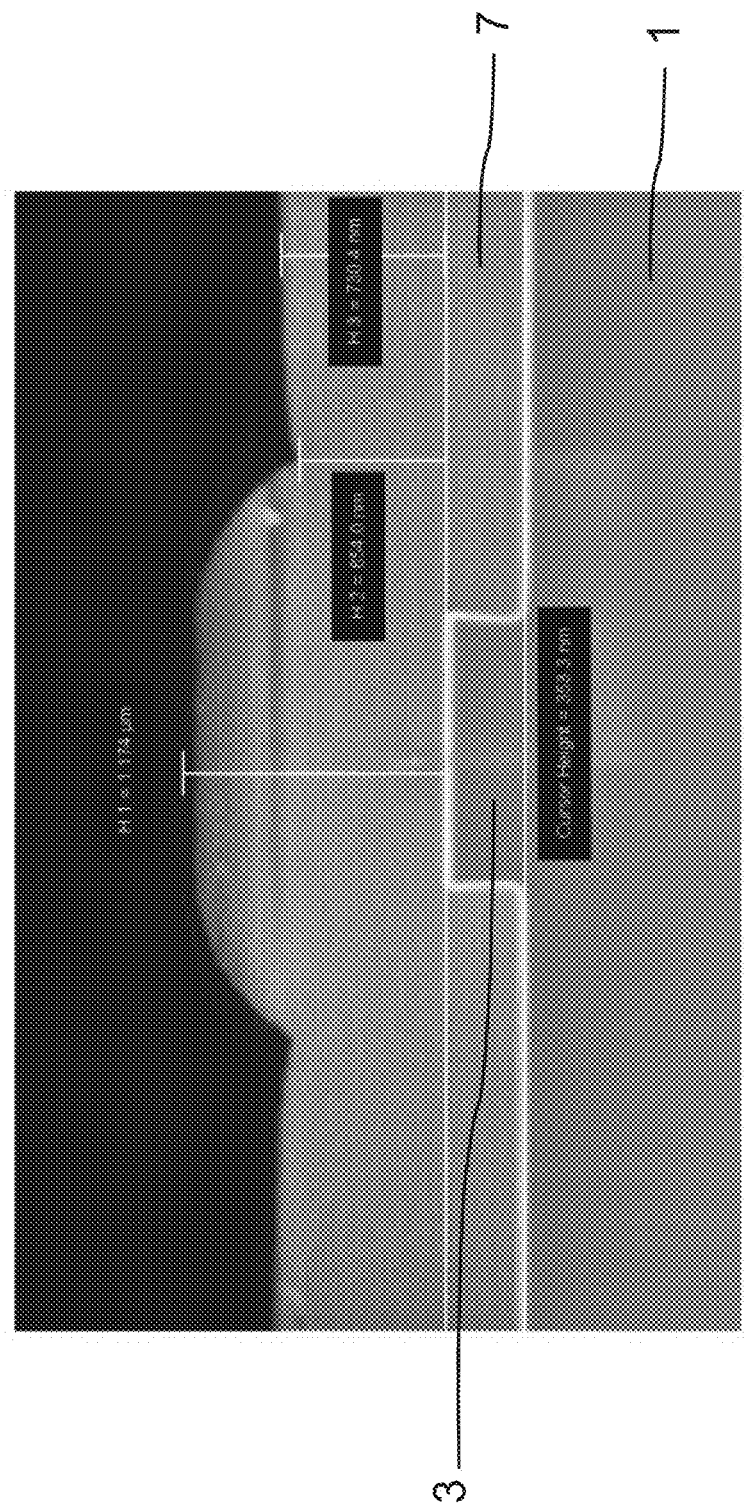
FIG. 7 a SEM image of an arrangement corresponding to FIG. 2.

To obtain the planarization coat 7, a coating material, in this case silicon dioxide ($SiO_2$), is applied, which can be done, for example, by chemical vapor deposition (CVD), such as low-pressure chemical vapor deposition (LPCVD) or plasma-enhanced chemical vapor deposition (PECVD), or physical vapor deposition or also atomic layer deposition (ALD) or sputtering. In the present case, PECVD is used. FIG. 7 shows a scanning electron microscope (SEM) image of an arrangement as shown in purely schematic sectional view in FIG. 2. The SEM image shows the thickness of the planarization coat 7, which—with slight variation in the lateral direction—is about 1.1 µm, both in the region above the waveguide 3 and on both lateral sides of it.

After the coating material is deposited, the upper side of the obtained planarization coat 7 is subjected to a planarization treatment.

For planarization, the planarization coat 7 is first provided with a spin-on-glass coating 9 on its upper side facing away from the waveguide 2 (step S3). For this purpose, a suitable material, in this case hydrogen silsesquioxane (HSQ), is spun onto the planarization coat 7 in the liquid state and then heated. During annealing, the material vitrifies, hence it is called spin-on-glass.

Due to the kinetics of liquid materials at height differences, a planarization effect results. The HSQ coat thickness is lower on an elevation on the surface, in this case the waveguides 3, than next to them. This effect can be seen well in FIG. 3, which shows the arrangement from FIG. 2 with the spin-on-glass coating 9 fabricated. The thickness of the coating above the waveguide 3 is less than laterally of the waveguide 3.

In a next step S4, an etching treatment is carried out, specifically a CHF3-based dry chemical etching, in this case RIE. In this step, etching is performed down to the planarization coat 7 and the spin-on-glass coating 9 is completely removed and the planarization coat 7 is partially removed.

In a preferred embodiment, the etching treatment is carried out in such a way that the etching rate for the spin-on-glass coating 9 is greater than or less than the etching rate for the planarization coat by a maximum of 50%, in particular by a maximum of 30%, preferably by a maximum of 10%. Exemplary values for etch rates are about 45 nm/min for HSQ and 33 nm/min for $SiO_2$. Suitable parameters for setting the etching process are, as it is known to the skilled person, for example pressure and/or the composition of the gas mixture and/or the power for exciting the plasma and/or DC voltage as well as temperature of the electrode.

The removing depth above the waveguide 3 coincides with or is similar to the removing depth in regions adjacent to the waveguide 3. Since the coat thickness of the spin-on-glass coating 9 was thinner above the respective waveguide 3 than next to it (cf. FIG. 3), more of the underlying planarization coat 7 is being removed above the respective waveguide 3 than next to it as a result. In other words, the uneven distribution of the spin-on-glass is specifically used to reduce the thickness of the planarization coat 7 on the waveguide 3 more than next to it. Since in the example shown, due to the kinematics in the liquid state, a spin-on-glass coating 9 with a lower thickness compared to regions lying next to the respective waveguide 3 results, it applies to all waveguides 3.

Figure 3:
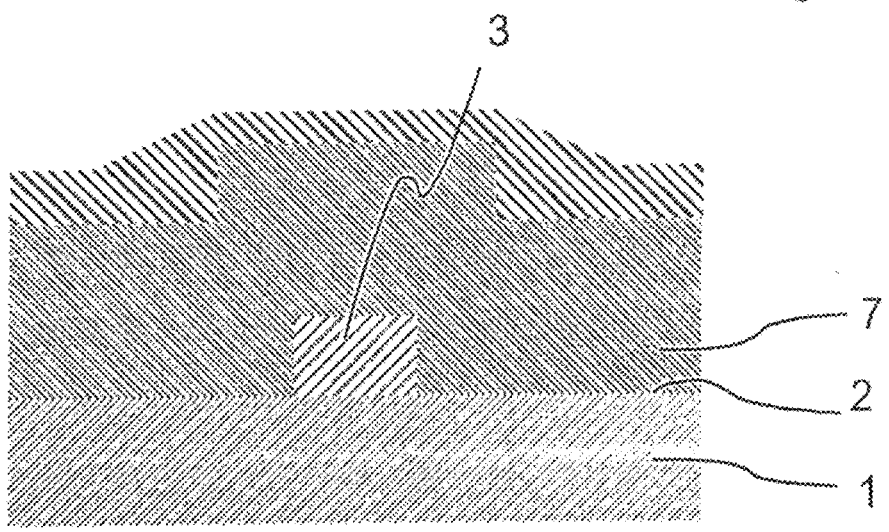
FIG. 3 the waveguide from FIG. 1 with a planarization coat and a spin-on-glass coating on the planarization coat.
Figure 4:
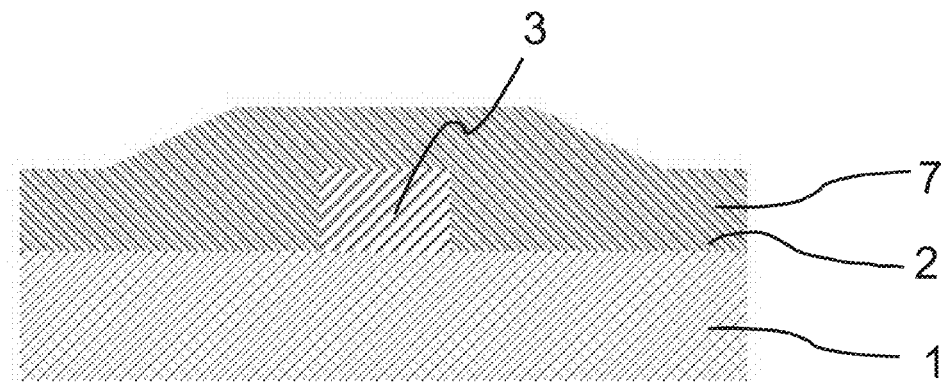
FIG. 4 the arrangement of FIG. 3 after a RIE etching treatment.
Figure 8:
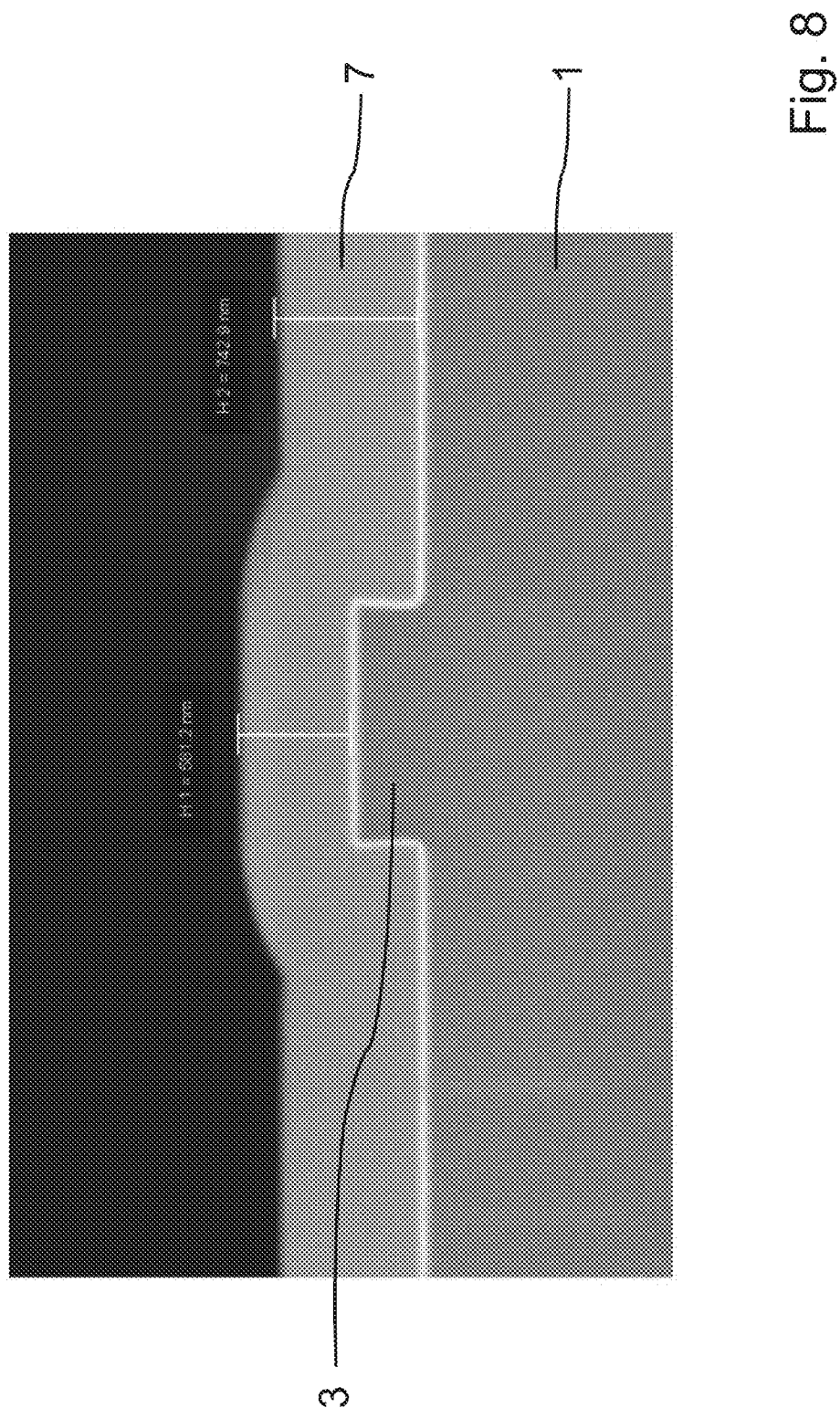
FIG. 8 a SEM image of the arrangement in FIG. 7 after a single resist planarization treatment.

The result, in particular the lower coat thickness above the waveguide 3, can be seen—purely schematically—in FIG. 4, which shows the arrangement from FIG. 3 after the etching treatment. The spin-on-glass coating 9 has been completely removed and the planarization coat 7 only partially. FIG. 8 shows an SEM image of the arrangement in FIG. 7 after a corresponding etching treatment. As can be seen, in this example the remaining coat thickness of the planarization coat 7 above the waveguide 3 is only 581.2 nm compared to a larger coat thickness of 742.9 nm next to it.

If necessary, the steps of providing the planarization coat 7 with a spin-on-glass coating 9 and etching treatment can be repeated one or more times to obtain an even flatter topology.

Figure 5:
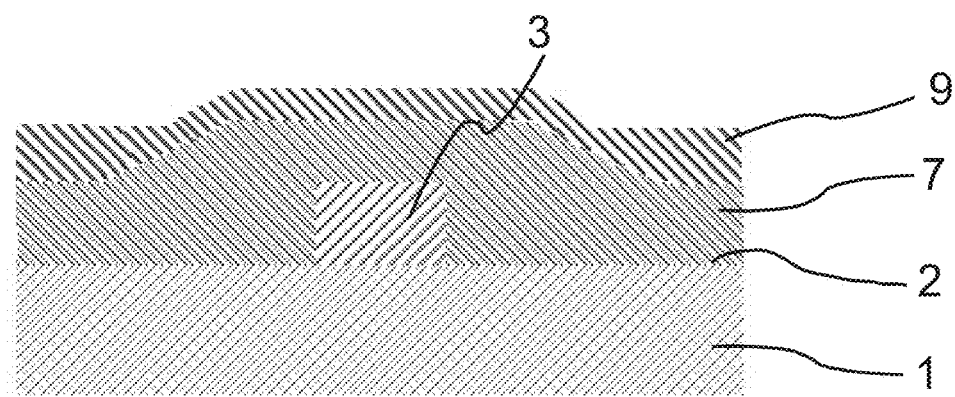
FIG. 5 the arrangement from FIG. 4 with a further spin-on glass coating fabricated after the etching process on the planarization coat.

Thus, in a step S5, a further spin-on-glass coating 9 can be provided on the planarization coat 7, in particular in the same way as the first spin-on-glass coating 9. FIG. 5 shows the arrangement of FIG. 4 with a renewed spin-on-glass coating 9 fabricated following the (first) etching process.

Figure 6:
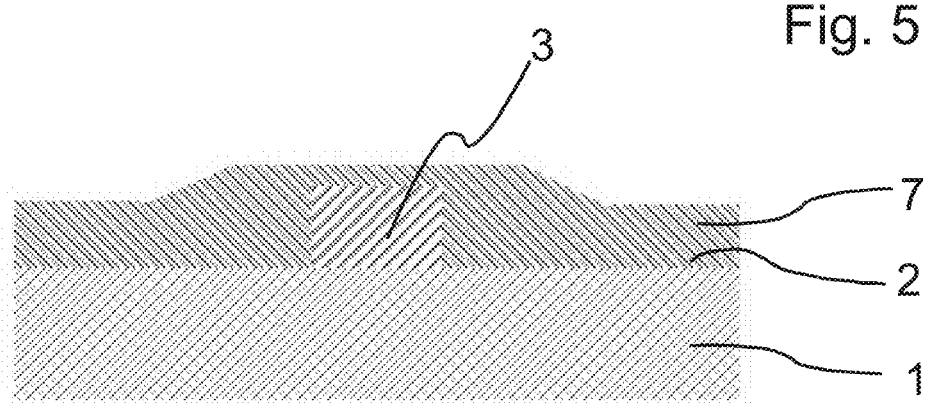
FIG. 6 the arrangement of FIG. 5 after another RIE etching.

A new etching (step S6), preferably with the same parameters as in step S4, leads to the arrangement shown in FIG. 6 as a result. As can be seen, the thickness of the planarization coat 7 on the waveguide 3 is less than in FIG. 4.

Figure 9:
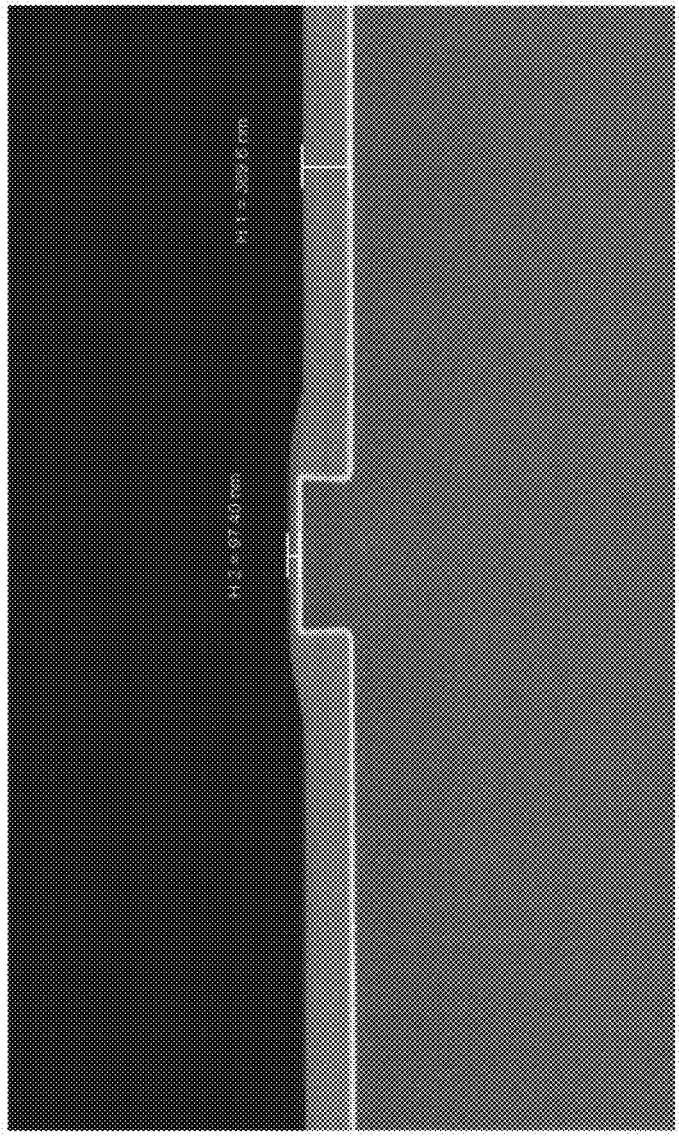
FIG. 9 a SEM image of the arrangement shown in FIG. 8 after a second resist planarization treatment.
Figure 10:
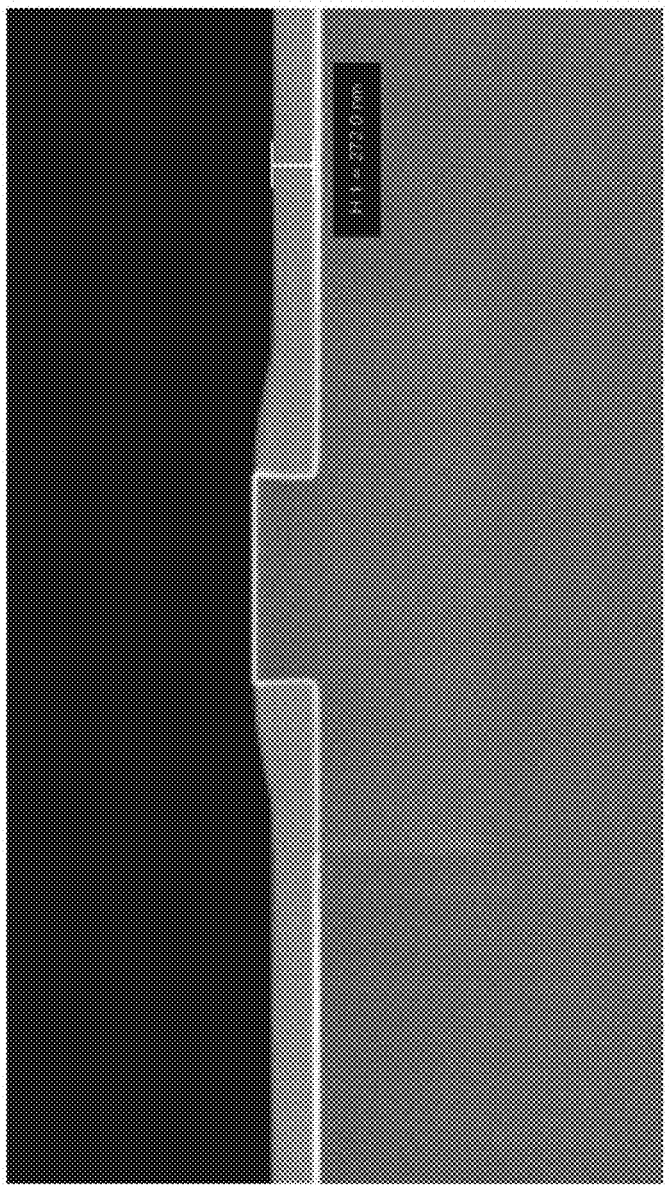
FIG. 10 a SEM image of the arrangement in FIG. 9 after a third resist planarization treatment.

FIGS. 9 and 10 show SEM images of the arrangement of FIG. 8 after a second and third pass of the steps of providing the planarization coat 7 with a spin-on-glass coating 9 and subsequent etching. The coat thickness of the planarization coat 7 on the waveguide 3 continues to decrease, in FIG. 9 it is still 97.40 nm and in FIG. 10 it is almost zero or zero.

After the above described planarization treatment with only one or also two or more passes of spin-on-glass coating 9 and subsequent etching, in a next step (presently step S7 after a repetition) an active element 10 is provided on the planarization coat 7 and above the waveguide 3, which active element 10 comprises or consists of at least one material which absorbs electromagnetic radiation of at least one wavelength and generates an electric photosignal as a result of the absorption and/or whose refractive index changes as a function of a voltage and/or the presence of charge(s) and/or an electric field.

In the described embodiment, a graphene film 10 is deposited as an active element on the planarization coat 7 and above the respective waveguide 3, presently by means of a transfer process as described in more detail above. In this case, in particular, a graphene film 10 fabricated on a separate substrate or a separate metal foil or a separate germanium wafer is transferred to the further planarization coat 13 above the (respective) waveguide 3. It is also possible that one or more graphene films 10 are fabricated directly on the further planarization coat 13, each above a waveguide. This may include, for example, material deposition and, if necessary, subsequent structuring.

Typical dimensions for active elements are in the range from 5 to 500 μm length on the waveguide along the propagation direction of the light (orthogonal to the drawing plane of FIGS. 1 to 12, 14 and 15) and 1 to 50 μm width across the propagation direction.

The respective graphene film 10 is arranged relative to the respective waveguide 3 such that it is exposed, at least in sections, to the evanescent field of electromagnetic radiation that is or may be guided by the respective waveguide 3.

Figure 13:
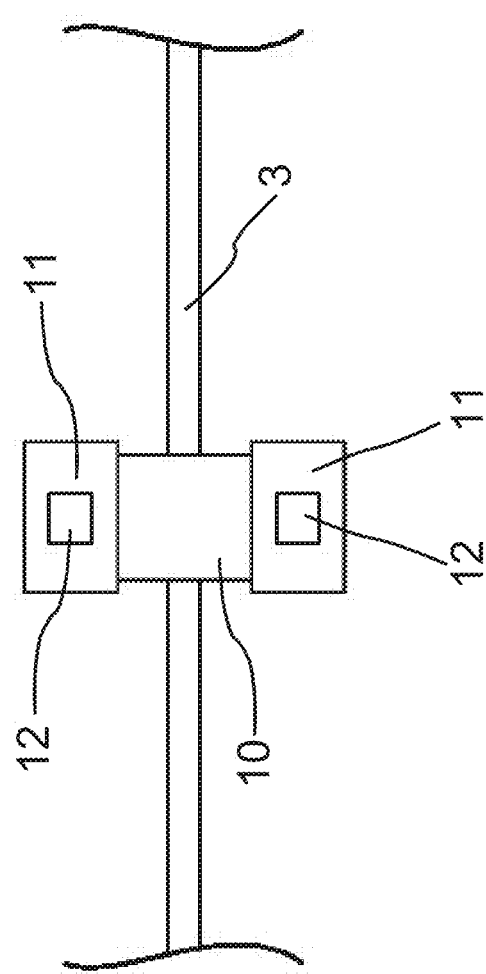
FIG. 13 a top view of the graphene film, the contact elements and the waveguide from FIG. 12.

It is expedient to subsequently fabricate contact elements 11 for the respective graphene film 10 (step S8), via which a connection to interconnection elements, specifically VIAs (Vertical Interconnect Access) 12, is achieved, which extend through the planarization coat 7, the $SiO_2$ coat 1 and sections of the wafer 4. The contact elements 11 can also be seen in the top view in FIG. 13. The contact elements 11 are fabricated in the present case by depositing at least one metal over the entire surface and then structuring by means of lithography and RIE. Exemplary metals for the contact elements 11 are nickel and/or titanium and/or aluminium and/or copper and/or chromium and/or palladium and/or platinum and/or gold and/or silver. Within the scope of the structuring, contact elements 11 can be fabricated for a plurality of graphene films 10.

It should be noted that it is also possible in principle for the contact elements 11 to be fabricated first, possibly only partially, such as at least a first layer or first layers of such, and then the or the respective graphene film 10 to be provided.

Via the contact elements 11 and the VIAs 12, an electrical connection of the graphene film 10 with integrated electronic components 13 of the wafer 4 can be realized. The VIAs 12 are shown only in FIG. 12, in which the wafer with the integrated electronic components 13 can also be seen. The components 13, which preferably comprise transistors and/or capacitors and/or resistors, are indicated in the purely schematic FIG. 12 only in simplified form by a line with hatching provided with the reference sign 13. The components 13 are located in a front-end-of-line (FEOL) 14 of the wafer 4 in a sufficiently known manner. Above this is the back-end-of-line (BEOL) 15, in which or via which the integrated electronic components 13 are interconnected by means of various metal planes. The integrated electronic components 13 in the FEOL 14 and the associated interconnection including the VIAs 12 in the BEOL 15 form integrated circuits of the wafer 4. The integrated circuits extend in a semiconductor substrate, in this case a silicon substrate 16, of the wafer 4.

It should be noted that the VIAs 7 or sections thereof extending through the wafer 4 and the $SiO_2$ coat 1 thereon were already present in the wafer 4 and the $SiO_2$ coat 1 when they were provided in the first step. The VIAs 12 or sections thereof extending through planarization coat 7 are or were conveniently fabricated together with planarization coat 7. The fabrication may be carried out in any manner known in the prior art. In particular, regions in which they are to extend can preferably be defined by lithography and dry-chemically etched by means of RIE. Subsequently, metallization can be carried out and the metallized surface can be structured, for example by means of CMP (Damascene process) or by means of lithography and RIE.

Figure 11:
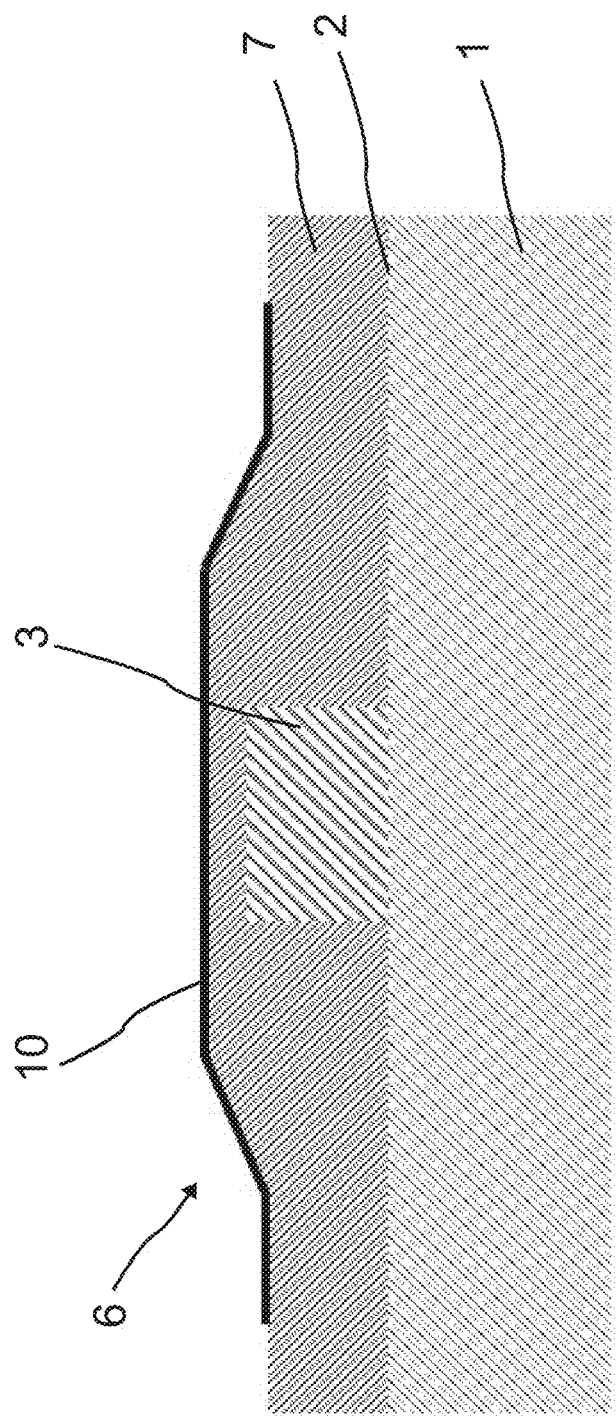
FIG. 11 the arrangement of FIG. 6 with a graphene film provided on the planarization coat.

As a result, one or more electro-optical devices—in the case of the example according to FIG. 11 with a graphene film 10—a photodetector is obtained which, in addition to the graphene film 10, comprises the underlying longitudinal section of the waveguide 3. The graphene film 10 and underlying waveguide 3 can also be taken from the purely schematic top view shown in FIG. 13. As can be seen, the longitudinal extent of waveguide 3 here is significantly greater than the longitudinal extent of graphene film 10.

Optionally, it is possible that an electro-optical device 6 is provided which is characterized by a plasmonic coupling or realizes such a coupling. Then, expediently, at least one plasmonic structure consisting of or comprising a plasmonically active material, preferably gold and/or silver and/or aluminum and/or copper, is provided on or above the or at least one active element 10. The plasmonic structure may then comprise one or more pairs of plasmonic elements arranged next to one another and consisting of or comprising the plasmonically active material. The plasmonic elements may be characterized by a section tapering in the direction of the other plasmonic element. The plasmonic elements, of which six pieces 8 (three pairs) are provided here, have a triangular shape. Resonant density fluctuations in the plasmonic structure are excited by the optical mode in the waveguide 3. This collective motion of electron distribution is referred to as plasmon and propagates in the plasmonic structure. Characteristics include a higher electric field strength compared to the optical mode. This results in a stronger absorption in graphene 10 or generally in an absorbing material.

A passivation coat can be provided above the electro-optical device(s). This can be used to protect the arrangement or circuit from environmental influences, in particular water. It should be noted that the passivation is not shown in the top view according to FIG. 13, but only the underlying arrangement.

In particular, in order to obtain a modulator, two active elements 10 or one active element 10 and one electrode can also be provided on the respective waveguide 3. The first variant is exemplarily shown in the purely schematic FIG. 14.

Figure 14:
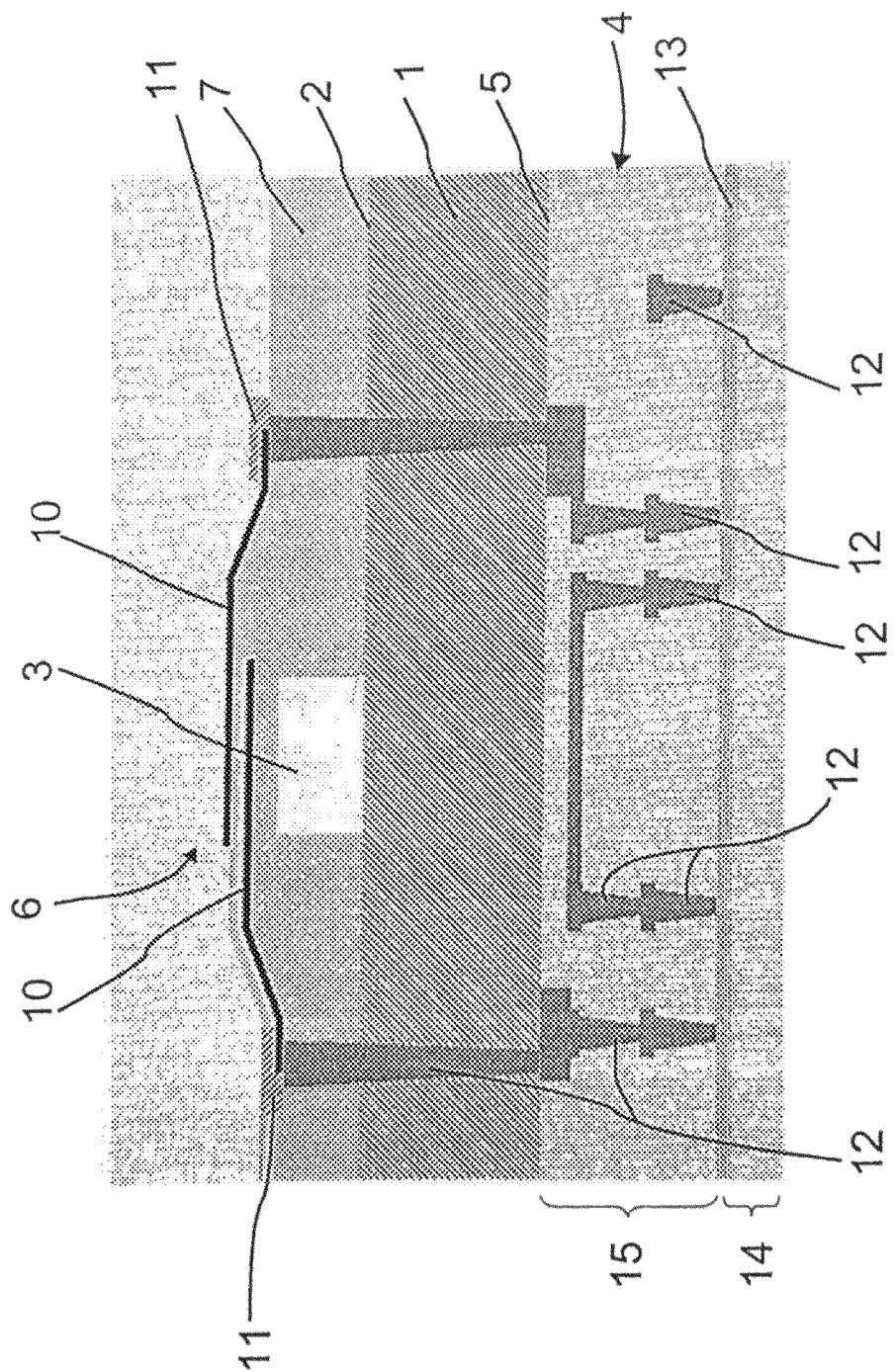
FIG. 14 an arrangement corresponding in large parts to the arrangement in FIG. 12 with an electro-optical device according to the invention in the form of a modulator comprising two graphene films.
Figure 15:
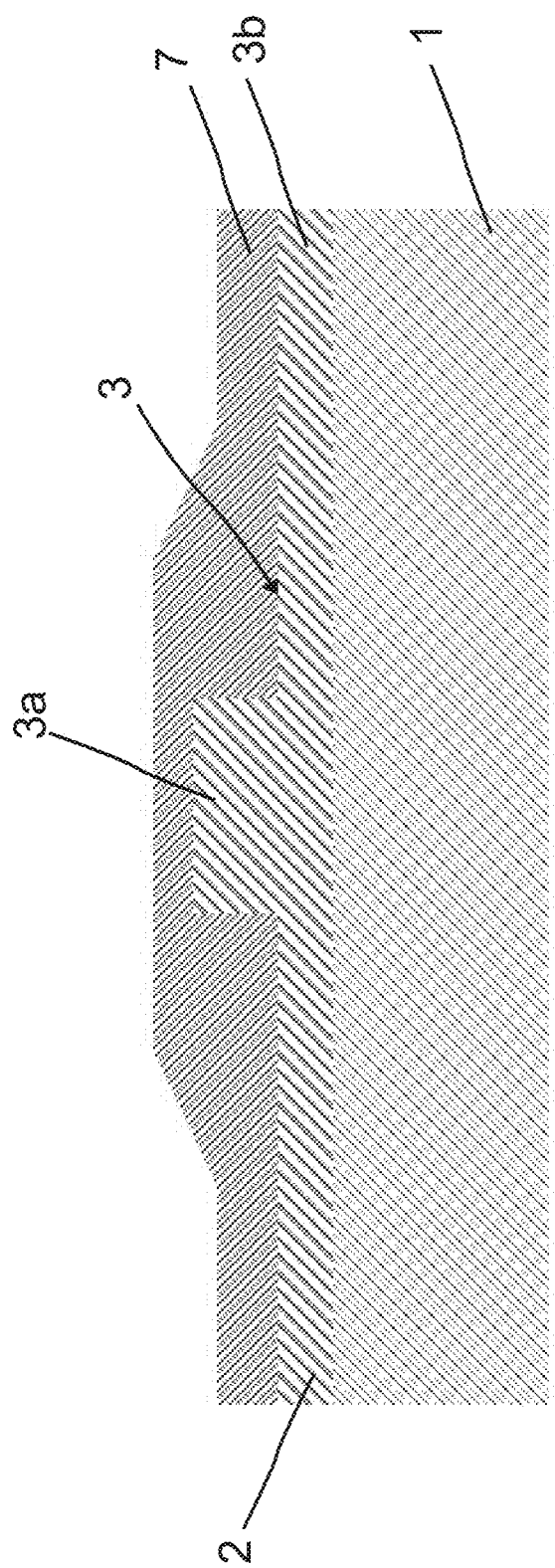
FIG. 15 another arrangement corresponding to the arrangement in FIG. 4, in which a ridge waveguide is provided instead of a strip waveguide.

For a modulator, the above steps S1 to S7 can be identical, in which case the active element provided in step S7, preferably also a graphene film 10, represents the lower film 10 in FIG. 14.

Then, in step S8, only one contact element 11 is fabricated for the lower graphene film 10.

In a step S9, a dielectric coat is fabricated on the lower graphene film 10, preferably comprising or consisting of at least one oxide and/or nitride, particularly preferably aluminum oxide and/or silicon nitride and/or hafnium oxide. In the present case, a dielectric coat is fabricated of aluminum oxide. This can be done-in analogy to planarization coat 7-by deposition, for example by means of one of the deposition processes mentioned for the latter. It is possible that the dielectric coat is fabricated over the entire wafer 4.

In a step S10, the or—in the case that a modulator 6 is fabricated for several of the waveguides 3—the respective further active element, in this case the (respective) further graphene film 10, can then be provided on the dielectric coat above the (respective) waveguide 3. The further graphene film 10 is thereby arranged offset to the first, lower graphene 10 in such a way that the lower graphene film 10 and the further, upper graphene film 10 lie in sections one above the other, in other words overlap in sections. As can be seen from FIG. 14, the overlapping region is located above the waveguide 3 and is similar in width to the waveguide 3. The second graphene film 10 may have the same extension as the first one.

Figure 16:
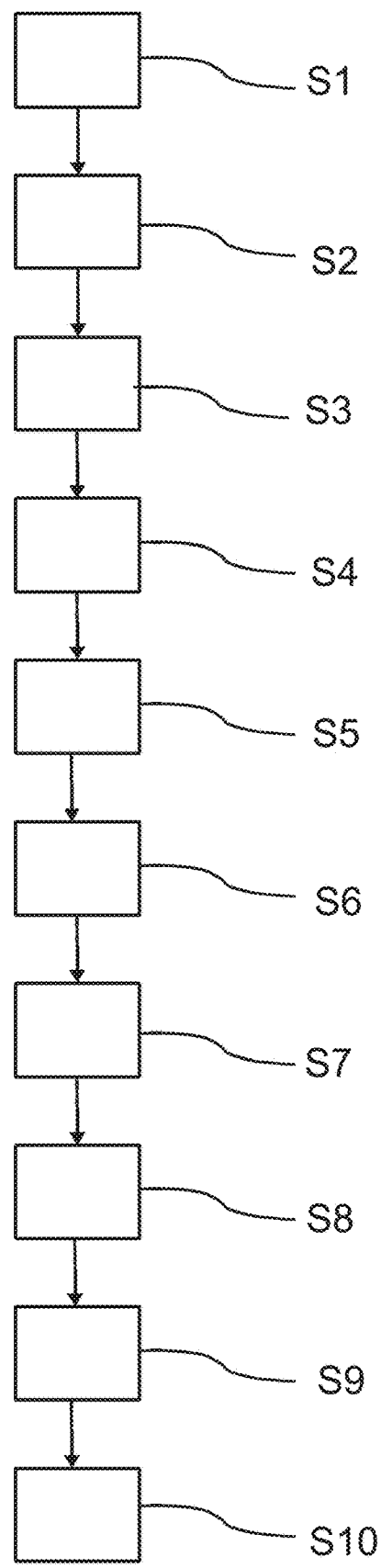
FIG. 16 a block diagram showing the steps of an embodiment of the method according to the invention.

In FIG. 16, all steps S1 to S10 are shown schematically. This shows both the steps for obtaining a photodetector (ending with step S8) and the steps for obtaining a modulator (all steps S1 to S10).

Finally, the contact element 11 for the further, upper graphene film 10 can be fabricated, preferably in the same way as the one for the lower film 10.

The wafer 4 with the electro-optical devices 6 fabricated thereon is an embodiment of a semiconductor device according to the invention.

It should be noted that one or more of the waveguides 3, alternatively to being formed as a strip waveguide 3 with a rectangular cross-section as shown in FIGS. 1 to 14, can also be formed, for example, as a ridge waveguide 3 with a T-shaped cross-section comprising a first, upper section 3 with a narrower rectangular cross-section and a second, lower section 3b with a significantly wider rectangular cross-section. FIG. 14 shows—purely schematically and by way of example—an arrangement corresponding to FIG. 6 with a ridge waveguide 3.

It is possible that the wafer 4 on which a plurality of electro-optical devices 6 have been fabricated in the manner described above is subsequently diced. In this way, a plurality of chips with integrated circuits can be obtained, each comprising at least one, preferably a plurality of electro-optical devices, in particular photodetectors 6 and/or modulator 6, which have been fabricated in the manner according to the invention.

The "bare chips" with electro-optical devices obtained by dicing can then be inserted into packages and put to further use, as it is already known from conventional bare chips.

A chip with electro-optical devices obtained by dicing the semiconductor device with the wafer 4 and the electro-optical devices 6 is an embodiment of a semiconductor apparatus according to the invention.

It should be noted that all partial sectional views show only a comparatively very small section, specifically a section showing only a small part of a chip region 4 or a chip obtained after dicing. All partial sections thus represent sections through both an embodiment example of a semiconductor apparatus according to the invention and an embodiment example of a semiconductor device according to the invention. Furthermore, it should be noted that a plurality of electro-optical devices 6 can already be provided above a single chip region 4 or chip, for example several tens, several hundreds or even several thousands, depending on the case of application.

The invention claimed is:

1. A method for manufacturing an electro-optical device, comprising the steps of:
   providing a waveguide (3) (step S1);
   fabricating a planarization coat (7) overlapping at least a section of the waveguide (3) by applying a coating material (step S2);
   providing the planarization coat (7) with a spin-on-glass coating (9) (step S3);
   carrying out a dry chemical etching treatment (step S4) at least in the region of the spin-on-glass coating (9), in the course of which etching is carried out down to the planarization coat (7) and the spin-on-glass coating (9) and part of the planarization coat (7) are removed, the steps of providing the planarization coat (7) with the spin-on-glass coating (9) and the etching treatment are repeated at least once (steps S5, S6), and wherein the step of fabricating of the planarization coat, the step of providing the spin-on glass coating, and subsequent etching treatment are carried out in such a way that the a coat thickness of the planarization coat (7) above the waveguide (3) or at least a section thereof is less than or equal to 50 nm, and
   providing (step S7) an active element (10) on or above the planarization coat (7) and above the waveguide (3), wherein the active element (10) comprises at least one material, which absorbs electromagnetic radiation of at least one wavelength and generates an electric photosignal as a result of the absorption and/or whose refractive index changes as a function of a voltage and/or a presence of charges and/or an electric field.

2. The method according to claim 1, wherein the electro-optical device is an electro-optical modulator (6) obtained performing the following steps:
fabricating a dielectric coat on the active element (10), the dielectric coat comprising at least one oxide and/or nitride, and
providing a further active element (10) is provided on an upper side of the dielectric coat facing away from the active element (10), the further active element (10) being arranged offset with respect to the first active element (10) in such a way that the first active element (10) and the further active element (10) lie one above the other in sections.

3. The method according to claim 2, wherein the active element (10) is provided on or above the upper side of the planarization coat (7) by applying the at least one material, or wherein the active element (10) is provided on the upper side of the planarization coat (7) by a transfer process.

4. The method according to claim 2, wherein a film is provided as the active element (10), and/or wherein as the at least one material of the active element (10), which absorbs electromagnetic radiation of at least one wavelength and generates an electrical photosignal as a result of the absorption and/or whose refractive index changes as a function of a voltage and/or the presence of charge and/or the electric field, graphene and/or at least one dichalcogenide, and/or germanium and/or lithium niobate and/or at least one electro-optical polymer and/or silicon and/or at least one compound semiconductor is used.

5. The method according to claim 2, wherein the planarization coat (7) is fabricated by applying the coating material at least one or above a section of the waveguide (3) and on regions lateral to the waveguide (3).

6. The method according to claim 1, wherein the active element (10) is provided on or above the upper side of the planarization coat (7) by applying the at least one material, or wherein the active element (10) is provided on the upper side of the planarization coat (7) by means of a transfer process.

7. The method according to claim 6, wherein the planarization coat (7) is fabricated by applying the coating material at least one or above a section of the waveguide (3) and on regions lateral to the waveguide (3).

8. The method according to claim 1, wherein a film is provided as the active element (10), and/or wherein as the at least one material of the active element (10), which absorbs electromagnetic radiation of at least one wavelength and generates an electrical photosignal as a result of the absorption and/or whose refractive index changes as a function of a voltage and/or the presence of charge and/or the electric field, graphene and/or at least one dichalcogenide, and/or germanium and/or lithium niobate and/or at least one electro-optical polymer and/or silicon and/or at least one compound semiconductor is used.

9. The method according to claim 8, wherein the planarization coat (7) is fabricated by applying the coating material at least one or above a section of the waveguide (3) and on regions lateral to the waveguide (3).

10. The method according to claim 1, wherein the planarization coat (7) is fabricated by applying the coating material at least one or above a section of the waveguide (3) and on regions lateral to the waveguide (3).

11. The method according to claim 1, wherein the planarization coat (7) is fabricated by depositing the coating material by at least one of chemical vapor deposition, plasma-assisted chemical vapor deposition, and physical vapor deposition.

12. The method according to claim 1, wherein the planarization coat (7) comprises at least one oxide, and/or at least one nitride and/or at least one polymer.

13. The method according to claim 1, wherein the etching treatment is carried out in such a way that the etching rate for the coating material of the planarization coat (7) is greater or smaller than the etching rate for the spin-on-glass by a maximum of 50%.

14. The method according to claim 1, wherein the electro-optical device (6) is fabricated on or above a wafer (4) or on or above a chip, and wherein the wafer (4) or the chip comprises integrated circuits with integrated electronic components (13).

15. An electro-optical device (6) obtained by the method according to claim 1.

16. A semiconductor apparatus comprising a chip and at least one electro-optical device (6) according to claim 15.

17. A semiconductor device comprising a wafer (4) and at least one electro-optical device (6) according to claim 15.

18. The method according to claim 1, wherein the electro-optical device is one of a photodetector (6) and an electro-optical modulator (6).

* * * * *